(12) United States Patent  
Aruga

(10) Patent No.: US 8,234,437 B2  
(45) Date of Patent: *Jul. 31, 2012

(54) DISK SUBSYSTEM

(75) Inventor: Kazuhisa Aruga, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/892,341

(22) Filed: Sep. 28, 2010

(65) Prior Publication Data

US 2011/0016257 A1    Jan. 20, 2011

Related U.S. Application Data

(63) Continuation of application No. 10/933,387, filed on Sep. 3, 2004, now Pat. No. 7,836,249, which is a continuation of application No. 10/337,397, filed on Jan. 7, 2003, now Pat. No. 6,976,116, which is a continuation of application No. 09/495,868, filed on Feb. 2, 2000, now Pat. No. 6,542,954.

(30) Foreign Application Priority Data

Feb. 2, 1999   (JP) .................................... 11-024648

(51) Int. Cl.
*G06F 13/16* (2006.01)
(52) U.S. Cl. ........................... 710/316; 710/38; 711/112
(58) Field of Classification Search .................. None
See application file for complete search history.

(56) References Cited

U.S. PATENT DOCUMENTS

| | | | |
|---|---|---|---|
| 4,825,354 A | 4/1989 | Agrawal et al. | |
| 4,937,763 A | 6/1990 | Mott | |
| 4,984,272 A | 1/1991 | McIlroy et al. | |
| 5,067,099 A | 11/1991 | McCown et al. | |
| 5,077,736 A | 12/1991 | Dunphy, Jr. et al. | 714/7 |
| 5,113,442 A | 5/1992 | Moir | |
| 5,144,659 A | 9/1992 | Jones | |
| 5,202,983 A | 4/1993 | Orita et al. | |
| 5,222,217 A | 6/1993 | Blount et al. | |
| 5,237,658 A | 8/1993 | Walker et al. | |
| 5,257,391 A | 10/1993 | DuLac et al. | |
| 5,274,645 A | 12/1993 | Idelman et al. | 714/6 |

(Continued)

FOREIGN PATENT DOCUMENTS

EP         0537098         1/1999

(Continued)

OTHER PUBLICATIONS

IBM, "Fibre Channel Standard Hub-Loop Redundancy for Higher RAS", IBM Technical Disclosure Bulletin, vol. 37, No. 4A, Apr. 1, 1994, pp. 383-385.

(Continued)

*Primary Examiner* — Gary Portka
(74) *Attorney, Agent, or Firm* — Mattingly & Malur, PC

(57) ABSTRACT

The storage system includes a plurality of disk drives; a plurality of disk array controllers, each disk array controller controlling Redundant Array of Independent Disks (RAID) processes on said disk drives; and a plurality of switches external of said disk array controllers. The switches are coupled to the disk array controllers and to the disk drives, whereby each of the disk drives is coupled to each of the disk array controllers via the switches. Connections between disk array controllers and disk drives can be made independently via the switches.

23 Claims, 7 Drawing Sheets

U.S. PATENT DOCUMENTS

| | | | |
|---|---|---|---|
| 5,283,830 A | 2/1994 | Hinsley et al. | |
| 5,301,297 A | 4/1994 | Menon et al. | |
| 5,471,586 A | 11/1995 | Sefidvash et al. | 710/104 |
| 5,572,711 A | 11/1996 | Hirsch et al. | |
| 5,611,056 A | 3/1997 | Hotchkin | |
| 5,617,568 A | 4/1997 | Ault et al. | |
| 5,666,511 A | 9/1997 | Suganuma et al. | |
| 5,668,958 A | 9/1997 | Bendert et al. | |
| 5,671,386 A | 9/1997 | Blair et al. | |
| 5,675,782 A | 10/1997 | Montague et al. | |
| 5,689,701 A | 11/1997 | Ault et al. | |
| 5,699,533 A | 12/1997 | Sakai | 710/316 |
| 5,729,763 A | 3/1998 | Leshem | 710/38 |
| 5,737,523 A | 4/1998 | Callaghan et al. | |
| 5,751,715 A | 5/1998 | Chan et al. | |
| 5,752,256 A | 5/1998 | Fujii et al. | |
| 5,754,756 A | 5/1998 | Watanabe et al. | 714/6 |
| 5,761,669 A | 6/1998 | Montague et al. | |
| 5,768,551 A | 6/1998 | Bleiweiss et al. | 710/316 |
| 5,812,754 A | 9/1998 | Lui et al. | |
| 5,819,292 A | 10/1998 | Hitz et al. | |
| 5,825,877 A | 10/1998 | Dan et al. | |
| 5,841,997 A | 11/1998 | Bleiweiss et al. | |
| 5,854,903 A | 12/1998 | Morrison et al. | |
| 5,867,640 A | 2/1999 | Aguilar et al. | 714/6 |
| 5,876,278 A | 3/1999 | Cheng | |
| 5,890,959 A | 4/1999 | Pettit et al. | |
| 5,915,087 A | 6/1999 | Hammond et al. | |
| 5,931,935 A | 8/1999 | Cabrera et al. | |
| 5,963,962 A | 10/1999 | Hitz et al. | |
| 6,018,790 A | 1/2000 | Itoh et al. | |
| 6,023,754 A | 2/2000 | DuLac et al. | |
| 6,098,155 A | 8/2000 | Chong, Jr. | |
| 6,148,414 A | 11/2000 | Brown et al. | 714/8 |
| 6,185,203 B1 | 2/2001 | Berman | 370/351 |
| 6,247,077 B1 | 6/2001 | Muller et al. | 710/74 |
| 6,289,376 B1 | 9/2001 | Taylor et al. | 709/219 |
| 6,301,625 B1 | 10/2001 | McDonald et al. | |
| 6,324,181 B1 | 11/2001 | Wong et al. | 370/403 |
| 6,356,984 B1 | 3/2002 | Day et al. | |
| 6,393,557 B1 * | 5/2002 | Guthridge et al. | 713/1 |
| 6,401,128 B1 | 6/2002 | Stai et al. | |
| 6,542,954 B1 | 4/2003 | Aruga | |
| 6,640,281 B2 | 10/2003 | Obara et al. | 711/114 |
| 6,715,034 B1 | 3/2004 | Kleiman et al. | |
| 6,721,317 B2 | 4/2004 | Chong, Jr. | 370/389 |
| 6,751,680 B2 | 6/2004 | Langerman et al. | 710/3 |

FOREIGN PATENT DOCUMENTS

| | | |
|---|---|---|
| JP | 04165526 | 6/1992 |
| JP | 5197495 | 8/1993 |
| JP | 6119125 | 4/1994 |
| JP | 6242887 | 9/1994 |
| JP | 07044322 | 2/1995 |
| JP | 07262033 | 10/1995 |
| JP | 08016328 | 1/1996 |
| JP | 830399 | 2/1996 |
| JP | 8328760 | 12/1996 |
| JP | 9512412 | 12/1997 |
| JP | 10161973 | 6/1998 |
| JP | 10171746 | 6/1998 |
| JP | 10326158 | 12/1998 |
| WO | 9625822 | 8/1996 |
| WO | 0143368 | 6/2001 |
| WO | 0244862 | 6/2002 |

OTHER PUBLICATIONS

Kembel "In-Depth Fibre Channel Arbitrated Loop", Fibre Channel Consultant, Northwest Learning Associates, Apr. 1997, pp. 7, 16-20.

Nass, "Connect Disk Arrays to EISA or PCI Buses", Electronic Design, vol. 41, No. 23, Nov. 11, 1993, 152-154.

Sebring Systems, "Sebring Rings in Networking", Sebring Systems, Inc. Aug. 9, 1999, pp. 1-14.

Sebring System, "Sebring Theory of Ring Operation (STROP)", Sebring Systems, Inc., Sep. 9, 1999, pp. 1-66.

Jp 07-044322 corresponds to U.S. Patent No. 5,301,297.

T. Nozama, Fiber Channel: Its Real Ability Shown in Server Input/Output, Maybe Option for High-Speed Network, Nikkei Communication, Japan, Nikkei BP, Inc., Oct. 5, 1998, vol. 279, pp. 106-113.

"Notification of Reasons for Refusal". App. No. 024648, Mar. 10, 2006.

T. Nozama, Fiber Channel: Its Real Ability Shown in Server Input/Output, Maybe Option for High-Speed Network, Nikk EI Communication, Japan, Nikkei BP, Inc., Oct. 5, 1998, vol. 279, pp. 106-113.

* cited by examiner

DISK SUBSYSTEM

The present application is a continuation of U.S. Ser. No. 10/933,387, filed Sept. 3, 2004 (now U.S. Pat. No. 7,836,249), which is a continuation of U.S. Ser. No. 10/337,397, filed Jan. 7, 2003, now U.S. Pat. No. 6,976,116, which is a continuation of U.S. Ser. No. 09/495,868, filed Feb. 2, 2000, (now U.S. Pat. No. 6,542,954), the entire disclosures of which are incorporated herein by reference.

This application claims priority to JP 11-024648, filed Feb. 2, 1999.

BACKGROUND OF THE INVENTION

The present invention relates to an electronic device including a computer system incorporating a disk subsystem, a disk array, or a disk drive. The present invention also relates to a technology, which allows high-speed transfer by means of arrayed disks connected by a fabric switch.

DESCRIPTION OF THE PRIOR ART

In general, the connection between a disc controller device and a plurality of disk drives in a disk array may be achieved, as disclosed in the JP-A No. 10-171746, by an SCSI interface or by a fibre channel arbitrated loop topology.

The SCSI interface, which uses a time-divided data transfer method on one signal line, negotiates with its initiator one to one for one moment on one signal line for an access.

The fibre channel arbitrated loop topology, on the other hand, may connect the initiator and disk drives in a loop by means of a serial interface, to enable time-division transfer of the data divided into frames to allow a number of communications with a plurality of devices at the same time and to allow up to 126 disk drive devices. to be connected.

Disk drives will become more and more compact and higher density implementation thus will ultimately realize the use of more disk drive devices. Ideally the connection of a disk drive with its interface one to one should be implemented to enable a maximum transfer rate.

An SCSI interface in the Prior Art adopts a one-to-one data transfer scheme for one moment in one signal line. This may be a drawback if one wishes to implement simultaneous communications between an initiator and a plurality of disk drives. The number of connectable disk drive units in one bus is also limited to 7 or 15. When one connects a number of drive units for one-to-one negotiation on the SCSI interface, a plurality of interfaces are required, causing difficulty in mounting. Because the number of the connectable disk drive units in one controller is so limited, one may encounter the necessity to add some further controller interfaces for connecting all units to a system.

When using a fibre channel, a plurality of disk drive units may be connected to is a single controller. In a case where the controller and disk drive units may be connected by implementing a fibre channel fabric switch for switching the connectivity, a substantial one-to-one connection between the controller and the disk drive units may be implemented. Although the controller may support a fabric protocol for switching connection, generic disk drive units support only a fibre channel arbitrated loop (FC-AL) protocol but not the fabric protocol.

This resulted in that the switching connection may not be implemented, so that a loop connection had to be used with the FC-AL for sharing a same loop between plural disk drive units.

More specifically, a device (a controlling device in this context) which supports the fabric protocol has a World Wide Name (WWN), as its unique 24-bit address. The device may be logged in to the fibre channel fabric switch by using this unique address. A device (a disk drive unit) which supports only the FC-AL protocol but not the fabric protocol uses significant 16 bits in a same 24 bit address for verifying location within the loop and least 8 bits for the address AL-PA (Arbitrated Loop Port Address: each disk unit have a unique value in the loop) for logging in to a device (a controlling device managing the loop).

In such a loop connection, if the number of disk drive units connected in the same loop is increased, a data transfer rate of disk drive units may ultimately exceed beyond a maximum data transfer rate of the loop, resulting in that the data transfer in this loop may be limited to efficiency of the maximum data transfer rate of the loop. The data transfer rate in such a loop will be decreased to that in an equivalent SCSI interface.

SUMMARY OF THE INVENTION

The present invention has been made in view of the above circumstances and has an object to overcome the above problems and to provide a switch connection having a protocol converter for converting a protocol used between a disk drive unit and a controlling device to allow the disk drive unit and the controlling device to be connected one to one in a switching connection. For a switch having such a protocol converter, such as an FL_Port in accordance with an ANSI standard.

Additional objects and advantages of the invention will be according to part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The following description of a preferred embodiment of the present invention may be best understood by reading carefully with reference to the accompanying drawings, in which.

DETAILED DESCRIPTION OF THE PREFERRED EMBODIMENTS

Figure 1:
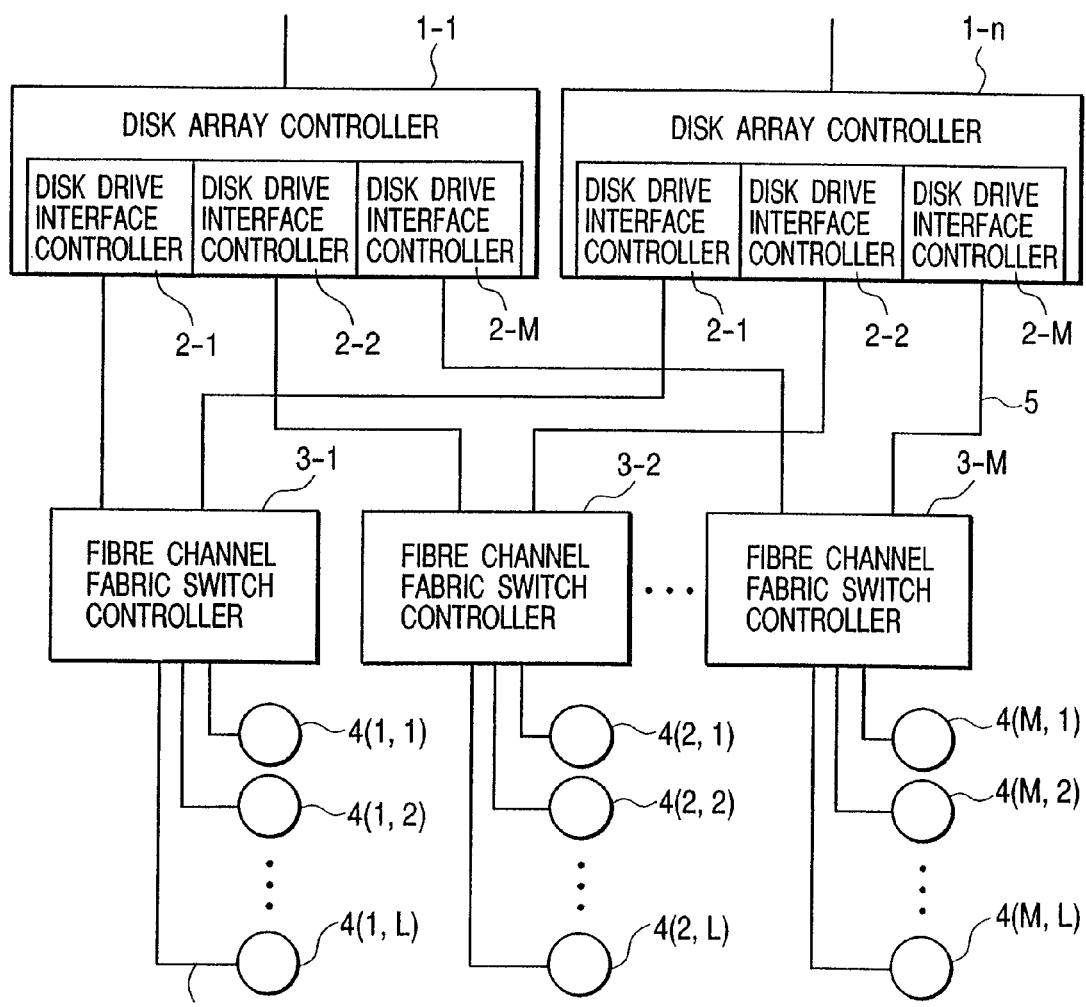
FIG. 1 is an overview of a preferred embodiment in accordance with the present invention.

A detailed description of a preferred embodiment of an external storage device (a disk subsystem) embodying the present invention will now be given referring to the accompanying drawings. FIG. 1 shows an overview of the device.

In the external storage device shown in the figure, N disk array controllers (controller section) 1-1 to 1-N (controllers in middle such as 1-2 are not shown, this applies to hereinbelow) are connected to a host computer (not shown) in an upper side, and provide M disk drive interface (disk drive I/F) controllers 2-1 to 2-M in a bottom side. The hardware configuration of the disk array controller will be described below in greater details. Each of M controllers of fibre channel fabric switch 3-1 to 3-M are respectively connected to the disk drive interface (I/F) controllers 2-1 to 2-M for controlling disk drive units through their fibre channel interface 5. L disk drive units are connected to one fibre channel fabric switch controller, a total of M by L disk drive units (4(1,1) to 4(M,L)) are connected to the fibre channel fabric switch controllers 3-1 to 3-M through fibre channel interfaces 6.

Each of disk drive interface controllers 2-1 to 2-M and disk drive units 4(1,1) to 4(M,L) has its unique identifier (ID number) for a loop protocol respectively. The fibre channel fabric switch controllers 3-1 to 3-M receive the ID numbers of the disk drive units to be connected from the disk drive interface controllers 2-1 to 2-M, to establish one-to-one connection between the corresponding disk drive interface controllers 2-1 to 2-M and the disk drive units 4(1,1) to 4(M,L).

Figure 2:
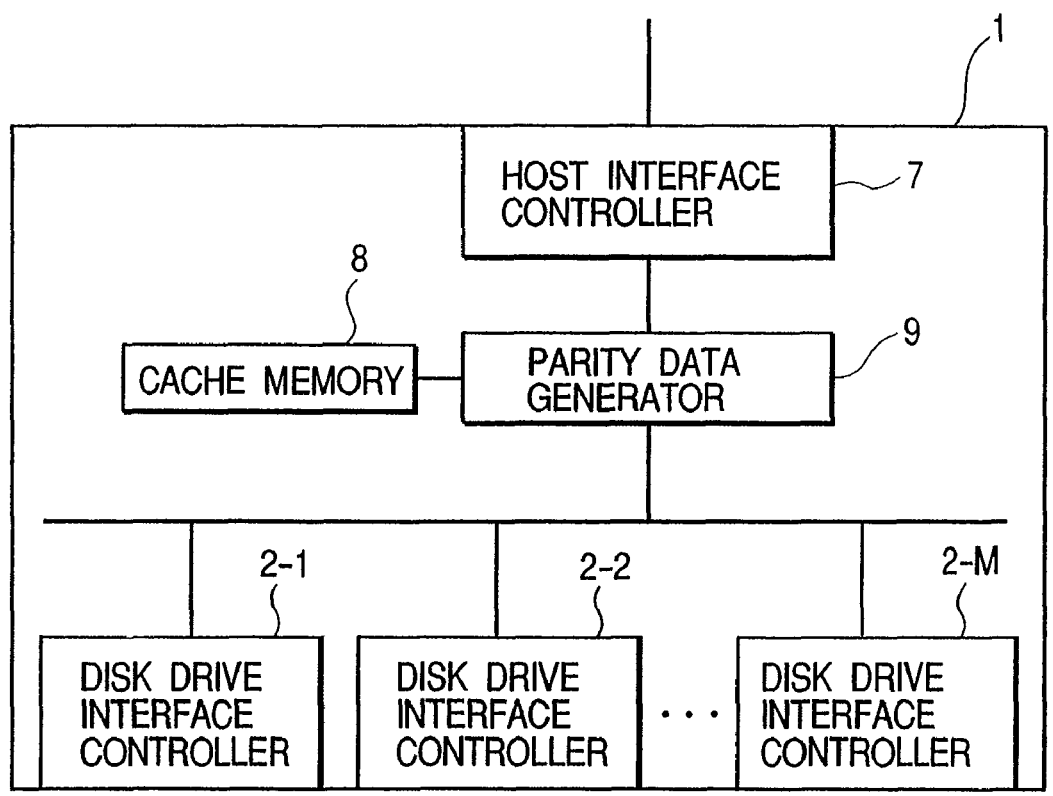
FIG. 2 is a schematic detailed block diagram of a disk array controller.

FIG. 2 shows a hardware configuration of the disk array controllers 1-1 to 1-N. Data transferred thereto from the host computer (not shown) is temporarily stored in a cache memory controlled by a host interface controller 7 so as to be added with parity data by a parity data generator 9, then to be split into (a total of M segments of) data blocks and parity data block(s). These data blocks and parity block(s) will be stored to a respective disk drive group (not shown) by the disk drive interface controllers 2-1 to 2-M, which are corresponding interfaces.

To transfer data to the host computer (not shown), if there is data to be transferred thereto in the cache memory 8, then the data in the cache will be transferred to the host by the host interface controller 7. If the data to be transferred to the host is not in the cache memory 8 then the disk drive interface controllers 2-1 to 2-M will read split data segments out of the disk drive group, concatenate split data segment blocks in the parity data generator 9, and store the complete data temporarily in the cache memory 8, and the host interface controller 7 will transfer the data to the host.

The foregoing embodiment depicts a data storage method in a case of a RAID system. However data may also be stored without the RAID system. Without the RAID system, parity data generator 9 does not exist. The data transferred from the host (not shown) are temporarily stored in the cache memory 8 and then written to any one of disk drive units in the disk drive group. When mirroring a same data will be written into the plural disk drive units. For reading out, the data will be read out of the disk drive units, stored temporarily in the cache memory 8 and the host interface controller 7 will transfer to the host.

It should be noted that in the following description, another embodiment of disk subsystem using the RAID system will be described, however the embodiment may equivalently be made without using the RAID system.

Figure 3:
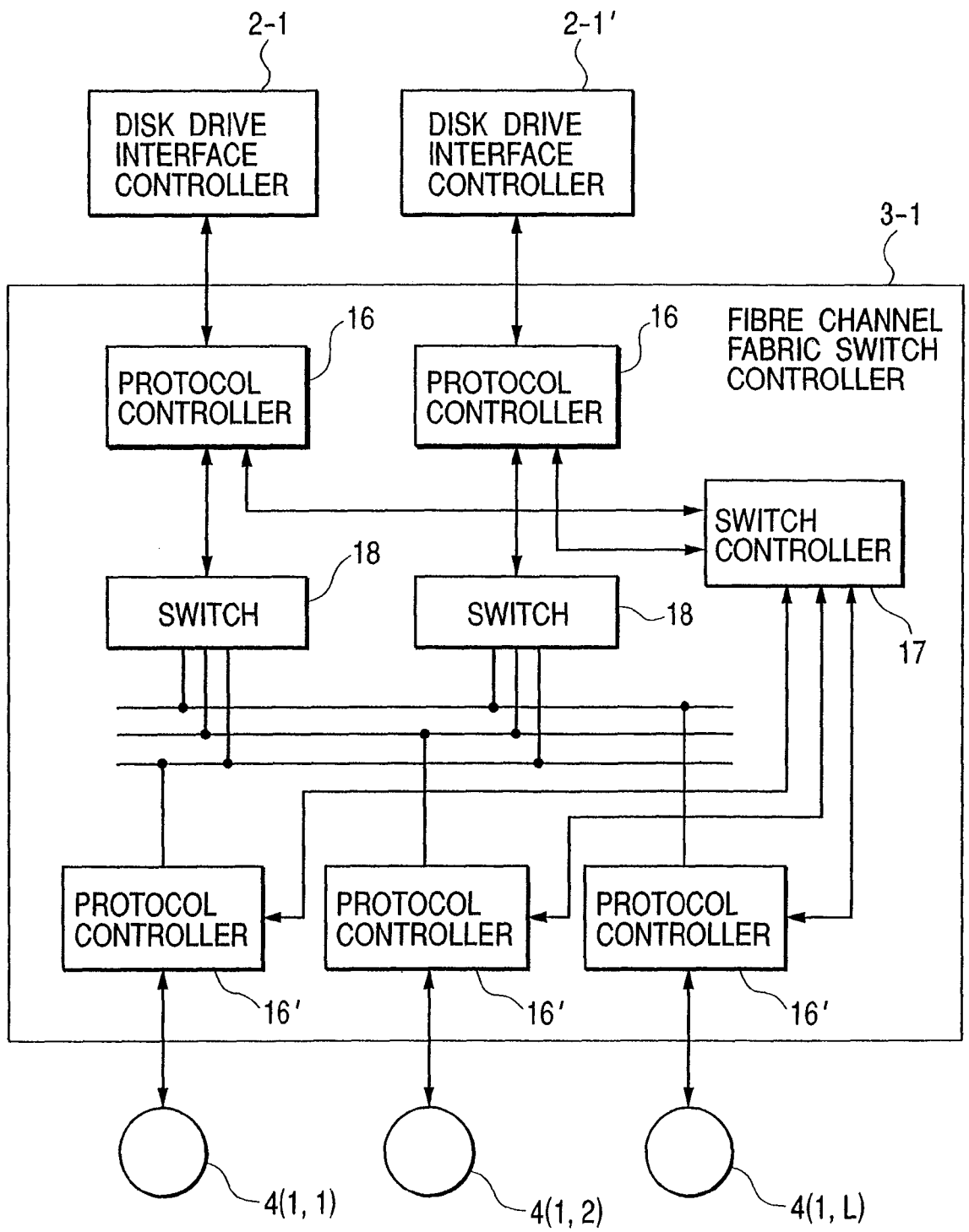
FIG. 3 is a schematic detailed block diagram of a fibre channel fabric switch controller.

FIG. 3 shows a hardware configuration of the fibre channel fabric switch controllers 3-1 to 3-M. A protocol controller 16 (a first protocol controller) connected to the disk drive interface controller 2-1 detects ID number of the disk drive units 4(1,1) to 4(1,L) to be accessed and controls a fibre channel protocol used. A protocol controller 16' (a second protocol controller) connected to the disk drive units 4(1,1) to 4(1,L) allocates a new ID number for a fabric protocol of the disk drive units 4(1,1) to 4(1,L) to the ID number for the loop protocol specific to the disk drive units 4, in order to report to a switch controller 17 the ID number of disk drive units 4(1,1) to 4(1,L) in charge. The switch controller 17, which maintains the ID numbers for these protocols of the disk drive units 4(1,1) to 4(1,L) by using for example a table, may set the switch 18 based on the ID number (fabric protocol) received from the disk drive interface controllers 2-1 to 2-M so as to establish the one-to-one connection.

In other words the switch controller 17 sets the corresponding 24-bit WWN address used in the fabric protocol to each of disk drive units 4 as a new ID number. Then the switch controller 17 may use a table to attempt to correspond the ID number for the loop protocol with the newly set ID number for the loop protocol. By corresponding the ID5 the disk drive interface controller may establish a connection to the disk drive unit 4 by using the newly set ID number. In this specification this coordination of ID numbers may also be referred to as a protocol control or a protocol conversion.

In addition, the protocol control may be set so as to be performed in the protocol controller 16', or may be set so as to switch the protocol controller 16 with the protocol controller 16' for the data transfer from the host computer and for the data transfer to the host, or for the data transfer for a normal operation and for the is data transfer for an operation in a disk failure.

Another configuration may also be used in which one of the protocol controller 16 and the protocol controller 16' is used, in such a case an ID number detector means may be provided instead of the protocol controller 16, or an ID number allocating means may be provided instead of the protocol controller 16'.

Alternatively, a protocol controller and switches may be provided within the disk drive interface controllers 2-1 to 2-M to allow direct connection to the disk drive units 4(1,1) to 4(1,L), instead of proprietary fibre channel fabric switches provided independently in the system.

Figure 4:
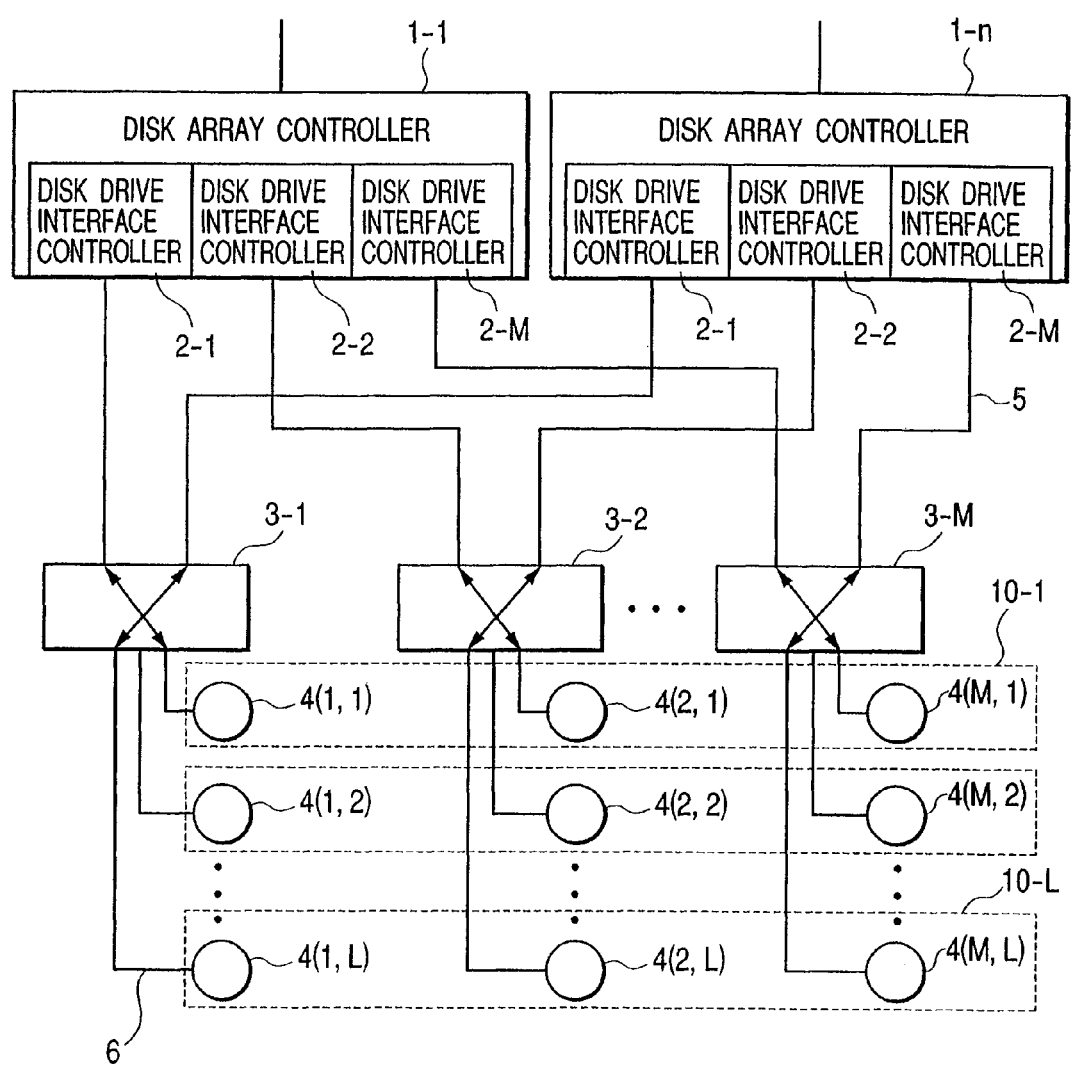
FIG. 4 is a schematic block diagram of a fibre channel fabric switch.

FIG. 4 shows an operation of the fibre channel fabric switch controllers 3-1 to 3-M.

The disk array controller 1-1 stores data split to M segments into a disk drive group 10-1. The disk drive interface controllers 2-1 to 2-M in the disk array controller 1-1 send the ID number of disk drive units belonging to the disk drive group 10-1 to the fibre channel fabric switch controllers 3-1 to 3-M so as to establish a switching. The protocol controller 16 in the fibre channel fabric switch controllers 3-1 to 3-M (see FIG. 3) detects the ID number sent to request the switch controller 17 to switch the switch connection in order to achieve the protocol control pertinent to the disk drive units. The switch controller 17 (see FIG. 3) switches a switch 18 (see FIG. 3) so as to connect the disk array controller 1-1 requesting connection to the requested disk drive unit 4 belonging to the disk drive group 10-1.

It should be recognized that since the disk array controller 1-1 is correspondingly connected to one disk drive group 10-1 through the fibre channel fabric switch controllers 3-1 to 3-M another disk array controller 1-N and the disk drive group 10-2 may separately perform another data transfer without interference. When the disk array controller 1-N establishes a connection to the disk drive group 10-L, the connection between the disk array controller 1-1 and the disk drive group 10-1 and the connection between the disk array controller 1-N and the disk drive group 10-L can operate separately from each other to perform the data transfer at a maximum data transfer rate possible between each disk array controller and respective disk drive unit.

Although not described in this specification the switch controller 17, when switching the connection as have been described above, may effectively maintain the maximum transfer window by switching the connection of the switch 18 upon reception of signals indicating that the disk drive unit connected thereto becomes ready to read/write at a time of data read or data write.

Figure 5:
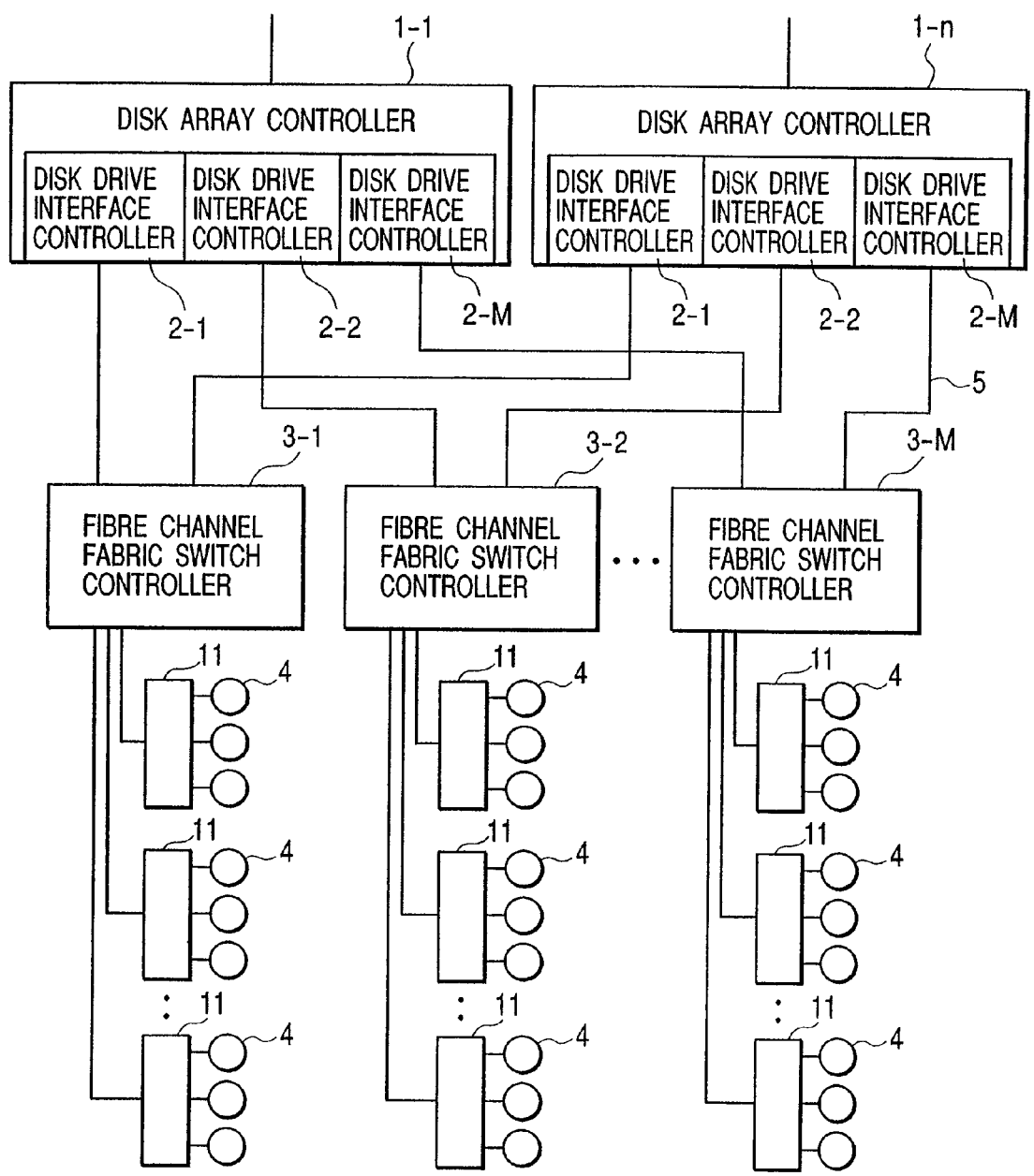
FIG. 5 is a schematic block diagram of a fibre channel fabric switch and an arbitrated loop.

FIG. 5 shows another extended embodiment in accordance with the present invention. In the embodiments above, the protocol controller 16 in a fibre channel fabric switch controller 3 was connected one to one to the disk drive unit 4. In the present embodiment however, a same section is configured such that the protocol controller 16 is connected in loop to the plural disk drive units 4 through a fibre channel arbitrated loop controller 11. In this manner, an array of a plurality of inexpensive disk drive units 4 may operate at the performance level equivalent to an expensive large disk drive unit of the same capacity. In this configuration not all disk drive units are connected in loop. Apparently the fibre channel arbitrated loop controller 11 and the plural disk drive units 4 form the single disk drive unit 4. The performance of accessing will not be degraded.

Although not shown in the figure, if the maximum data transfer rate of the fibre channel interface is enough higher with respect to the accessing speed of disk drive, the number of disk drive units 4 may be increased without aggravation of access performance, by connecting the plural disk drive units 4 to the fibre channel arbitrated loop controller 11, by connecting the plural disk drive units in a same loop, and by sharing the maximum transfer rate of the fibre channel with the plural disk drive units 4.

Figure 6:
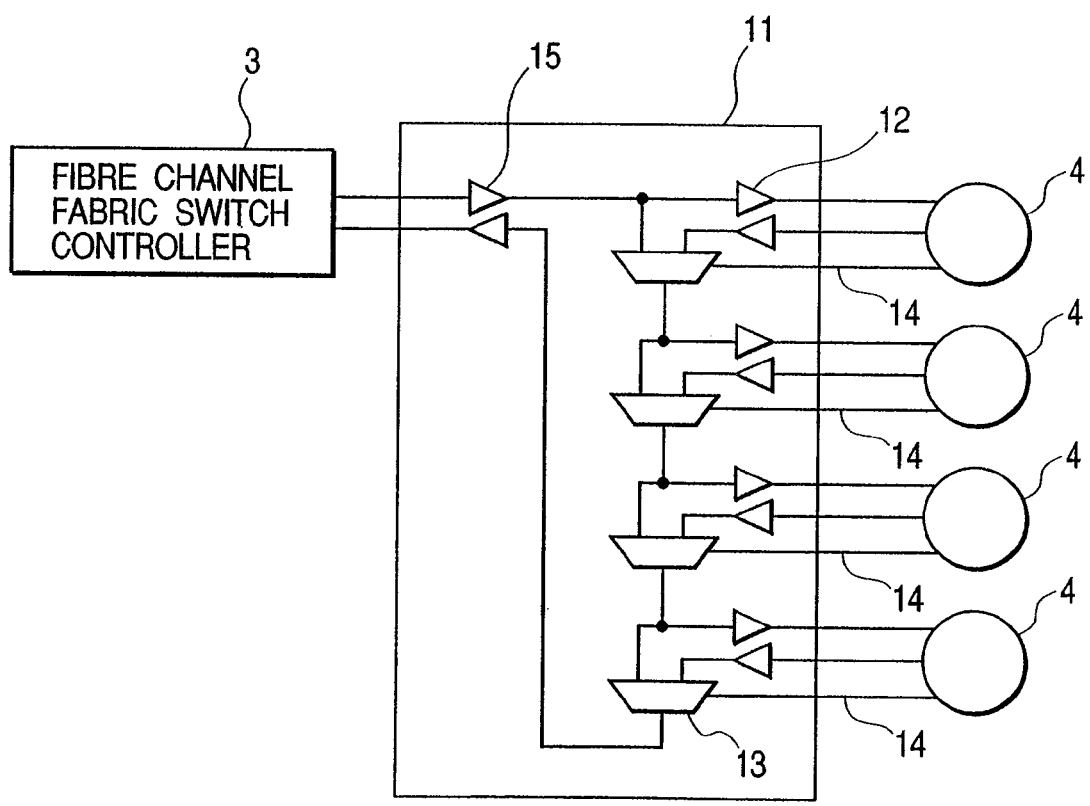
FIG. 6 is a schematic detailed block diagram of a fibre channel arbitrated loop controller.

FIG. 6 shows a hardware configuration of the fibre channel arbitrated loop controller 11 used for the embodiment shown in FIG. 5.

A fibre channel arbitrated loop controller 11 comprises a loop bypass circuit 13, a plurality of disk drive unit attaching ports 12, and a fabric switch connector port 15. From disk drive units 4 loop bypass circuit switching signal 14 is output, allowing ports to be bypassed in case of failure, in order to enable hot swapping of disks. More specifically, loops will keep alive, other operating disks will not be affected, and the failed disk drive unit can be detached and/or new disk drive units can be added.

Figure 7:
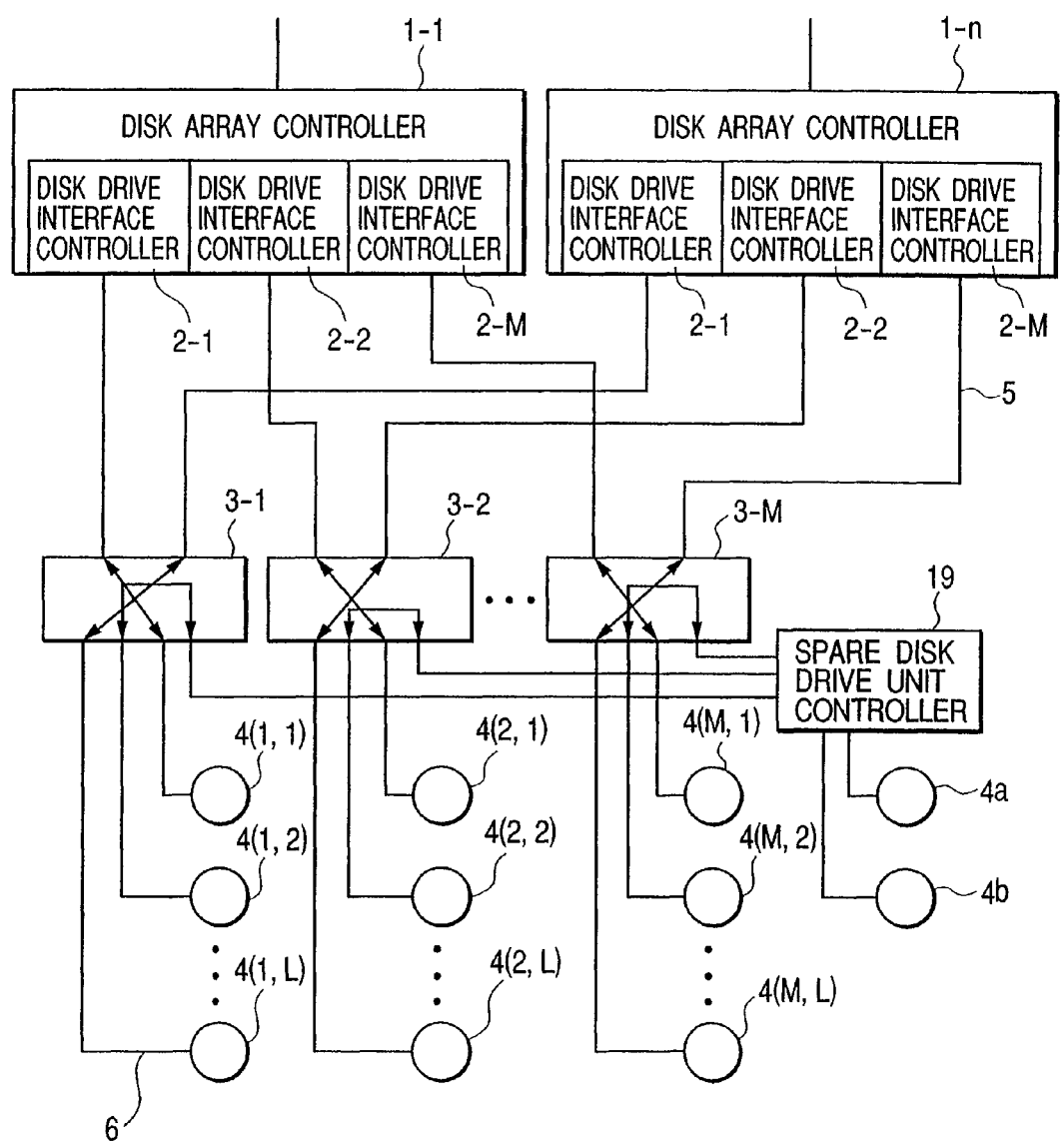
FIG. 7 is a schematic detailed block diagram of a spare disk drive unit controller.

FIG. 7 shows another extended embodiment in accordance with the present invention.

The present embodiment comprises spare disk drive unit controllers 19 each connected to respective fibre channel fabric switch controllers 3-1 to 3-M, a plurality of spare disk drive units 4-a and 4-b each connected to the spare disk drive unit controllers 19. The spare disk drive units 4-a and 4-b are provided in common to all (disk drive units connected to) switch controller circuits. These spare disk drive units 4-a and 4-b may be either connected in loop to a spare disk drive unit controllers 19, or switched.

Within the fibre channel fabric switch controller 3, the protocol controller 16' (see FIG. 3) connected to a disk drive group having a failed disk drive unit 4 (in the figure the disk drive unit 4(1,2)) may be connected to the spare disk drive unit controllers 19 through the switch controller 3-1.

If a disk drive unit is not operating well, the disk array controller 1-1 to 1-n attempts to rebuild the data structure in the spare disk drive unit 4-a or 4-b. When a specific disk drive unit 4 has so many operational errors that a failure of disk drive unit mechanism is forecasted, the array controller 1-1 picks up and copies data stored in the malfunctioning disk drive unit 4 to a spare disk drive unit 4-a or 4-b and rebuilds the disk array.

The switch controller of the present embodiment then has an internal configuration or layout of a switch 18' slightly different from the switch controllers as described in the preceding embodiments so as to enable input from the disk drive units to be output to the disk drive units 4. For example, another switch 18' may be provided between the protocol controller 16' and the switch 18 to determine according to the request from the spare disk drive unit controller 18 whether the output from the disk drive units is routed to the switch 18 or routed to another protocol controller 16'.

If a disk drive unit fails and the data stored therein cannot be read out, lost data may be reconstructed in the cache memory 8 and parity data generator 9 in the disk array controller 1 from the data stored in the other disk drive units of the same disk drive group as the failed disk drive unit 4 to rebuild the data into the spare disk drive unit 4-a or 4-b.

It should be noted that the switch controller 3 identical to the preceding embodiments may be used because the disk array controller 1 may be served for the data recovery when the data stored in an erroneous disk drive unit 4 is copied to a spare disk drive unit.

In addition, the spare disk drive unit controllers 19 may be independently served for the data recovery from a failed disk drive unit. To do this, cache memory and parity data generator should be provided in the spare disk drive unit controllers. 19. The spare disk drive unit controllers 19 may read out data from the disk drive units other than the failed unit in the same group to regenerate the lost data segments and store thus generated data in a spare disk drive unit 4-a or 4-b.

The data recovery without affecting to the data access operation from the host computer may be achieved by performing access operation to the spare disk drive unit controllers 19 from the failed disk drive unit 4 or from other disk drive units storing split data including the parity for the recovery of errors, independently of the data access operation between the disk drive units 4 (disk drive group comprising disk drive units 4(1,1) to 4(1,L) in the figure) and the host computer via the disk array controllers 1-1 to 1-N.

In a similar manner, when a failed disk drive unit has been hot-swapped with a disk drive unit off the shelf, the recovery of failed unit may be achieved without affecting any access from the host, as the spare disk drive unit controller 15 may establish one-to-one connection for the fibre channel fabric switch controllers 3-1 to 3-M, switched from the spare disk drive units 4-a and 4-b to a healthy disk drive unit newly hot-swapped with a failed disk drive unit, to perform data copy/recovery independently of the access from the disk array controller 1-1 to 1-N to the disk drive group 10-1 to 10-L (see FIG. 4).

The present invention provides the connectivity of the plural disk drive units to a disk drive unit interface without compromising the transfer performance by using the fibre channel interface, which is a scheme of serial interface, and by applying a fibre channel fabric topology, which allows hot swapping of connectivity. The present invention further provides a solution of controlling the plural disk drive units with one or a few disk drive unit controllers, by hot-swapping the connectivity for each controller and disk drive group. In addition, the present invention provides improved reliability of the system by performing the operation of data recovery in case of disk drive unit failure, independently of the data transfer between the disk drive interface controllers and the disk drive units.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. it is intended that the scope of the invention be defined by the claims appended hereto, and their equivalents.

What is claimed is:

1. A storage system comprising:
   a plurality of disk drives;
   a plurality of disk array controllers, each disk array controller controlling Redundant Array of Independent Disks (RAID) processes on said disk drives; and
   a plurality of switches external of said disk array controllers, said switches being coupled to said disk array controllers and to said disk drives,
   wherein
   a first disk drive of said disk drives is coupled to a first disk array controller of said disk array controllers via a first switch of said switches and is coupled to a second disk array controller of said disk array controllers via a second switch of said switches,
   a second disk drive of said disk drives is coupled to said first disk array controller via said first switch and is coupled to said second disk array controller via said second switch,
   said first switch performs path switching among paths, each of which is coupled to one disk drive of said disk drives, when said first switch receives information related to one destination disk drive, so that data is transferred between one of said disk array controllers and said one destination disk drive of said disk drives via said first switch,
   said second switch performs path switching among paths, each of which is coupled to one disk drive of said disk drives, when said second switch receives information related to another destination disk drive, so that data is transferred between one of said disk array controllers and said another destination disk drive of said disk drives via said second switch, and a data transfer between said one of said disk array controllers and said one destination disk drive via said first switch is performed separately from a data transfer between said another one of said disk array controllers and said another destination disk drive via said second switch.

2. The storage system according to claim 1, wherein said information related to said one destination disk drive identifies said one destination disk drive and is received from said one of said disk array controllers.

3. The storage system according to claim 1, wherein said information related to said one destination disk drive an ID number of said one destination disk drive.

4. A storage system comprising:
   a plurality of disk drives;
   a plurality of disk array controllers coupled to a host computer, each of said disk array controllers controlling Redundant Array of Independent Disks (RAID) processes on said disk drives; and
   a plurality of switches external of said disk array controllers,
   wherein
   a first disk drive of said disk drives is coupled to a first disk array controller of said disk array controllers via a first switch of said switches and is coupled to a second disk array controller of said disk array controllers via a second switch of said switches,
   a second disk drive of said disk drives is coupled to said first disk array controller via said first switch and is coupled to said second disk array controller via said second switch,
   said first switch performs path switching among paths, each of which is coupled to one disk drive of said disk drives, when said first switch receives information related to one destination disk drive, so that a first data transfer of data received from said host computer between one of said disk array controllers and said one destination disk drive of said disk drives is performed,
   said second switch of said switches performs path switching among paths, each of which is coupled to one disk drive of said disk drives, when said second switch receives information related to another destination disk drive, so that a second data transfer of data received from said host computer between another one of said disk array controllers and said another destination disk drive of said disk drives is performed, and
   said first data transfer is performed separately from said second data transfer.

5. The storage system according to claim 4, wherein said information related to said one destination disk drive is information identifying said one destination disk drive.

6. The storage system according to claim 4, wherein said information related to said one destination disk drive is an ID number of said one destination disk drive.

7. A storage system comprising:
   a plurality of disk drives;
   first second disk array controllers, each of said first and second disk array controllers being adapted to control Redundant Array of Independent Disks (RAID) processes on each of said disk drives;
   a first switch, external of said first and second disk array controllers, being coupled to said first disk array controller and to said disk drives;
   a second switch, external of said first and second disk array controllers, being coupled to said second disk array controller and to said disk drives;
   wherein
   said first switch performs path switching among paths, each of which is coupled to one disk drive of said disk drives, when said first switch receives information related to one destination disk drive, so that data is transferred between said first disk array controller and said one destination disk drive of said disk drives via said first switch,
   said second switch performs path switching among paths, each of which is coupled to one disk drive of said disk drives, when said second switch receives information related to another destination disk drive, so that data is transferred between said second disk array controller and said another destination disk drive of said disk drives via said second switch controller, and
   wherein a data transfer between said first disk array controller and said one destination disk drive via said first switch is performed separately from a data transfer between said second disk array controller and said another destination disk drive via said second switch.

8. The storage system according to claim 7, wherein said information related to said one destination disk drive is sent from said first disk array controller to said first switch and identifies said one destination disk drive.

9. The storage system according to claim 7, wherein said information related to said one destination disk drive is an ID number of said one destination disk drive.

10. A storage system comprising:
a plurality of disk drives;
a disk array controller being adapted to control Redundant Array of Independent Disks (RAID) processes on said disk drives;
a plurality of switches external of said disk array controller, said switches being coupled to said disk array controller and to said disk drives, wherein
a first disk drive of said disk drives is coupled to said disk array controller via a first switch of said switches and is coupled to said disk array controller via a second switch of said switches,
a second disk drive of said disk drives is coupled to said disk array controller via said first switch and is coupled to said disk array controller via said second switch,
said first switch performs path switching among paths, each of which is coupled to one disk drive of said disk drives, when said first switch receives information related to one destination disk drive so that a first data transfer of data received from said host computer between said disk array controller and said one destination disk drive of said disk drives is performed,
said second switch performs path switching among paths, each of which is coupled to one disk drive of said disk drives, when said second switch receives information related to another destination disk drive so that a second data transfer of data received from said host computer between said disk array controller and said another destination disk drive of said disk drives is performed, and
said first data transfer is performed separately from said second data transfer.

11. The storage system according to claim 10:
wherein said information related to said one destination disk drive is received from said disk array controller and identifies said one destination disk drive.

12. The storage system according to claim 10:
wherein said information related to said one destination disk drive is an ID number of said one destination disk drive.

13. A storage system comprising:
a plurality of disk drives;
at least one disk array controller being adapted to control Redundant Array of Independent Disks (RAID) processes on said plurality of disk drives; and
a plurality of switches, external of said at least one disk array controller, being coupled to said at least one disk array controller and to said disk drives,
wherein
a first disk drive of said disk drives is coupled to said at least one disk array controller via a first switch of said switches and is coupled to said at least one disk array controller via a second switch of said switches,
a second disk drive of said disk drives is coupled to said at least one disk array controller via said first switch and is coupled to said at least one disk array controller via said second switch,
each of said switches is able to individually perform path switching among paths, each of which is coupled to one disk drive of said disk drives, when each of said switches receives information related to one selected disk drive, so that data is transferred between said at least one disk array controller and said one selected disk drive of said disk drives via each of said switches,
and said first switch of said switches is able to transfer data received from said at least one disk array controller to said one selected disk drive separately from another data transfer between said at least one disk array controller and another selected disk drive of said disk drives, said another data transfer performed via said second switch.

14. The storage system according to claim 13:
wherein said information related to said one selected destination disk drive is received from said at least one disk array controller and identifies said one selected disk drive.

15. The storage system according to claim 13:
wherein said information related to said one selected destination disk drive is an ID number of said one selected disk drive to one of said switches for transferring data to said one selected disk drive.

16. The storage system according to claim 13:
wherein one of said disk drive groups stores a plurality of data and a parity data related to said data.

17. A storage system comprising:
a plurality of disk drives;
a plurality of disk array controllers, each disk array controller controlling Redundant Array of Independent Disks (RAID) processes on said disk drives; and
a plurality of switches external of said disk array controllers, wherein
a first disk drive of said disk drives is coupled to a first disk array controller of said disk array controllers via a first switch of said switches and is coupled to a second disk array controller of said disk array controllers via a second switch of said switches,
a second disk drive of said disk drives is coupled to said first disk array controller via said first switch and is coupled to said second disk array controller via said second switch,
each of said switches when receiving information related to one destination disk drive, performs path switching among paths, each of which is coupled to one disk drive of said disk drives, based on said received information, so that data is transferred between one of said disk array controllers and said one destination disk drive of said disk drives via each of said switches.

18. The storage system according to claim 17, wherein said information related to said one destination disk drive identifies said destination disk drive and is received from said one of said disk array controllers.

19. The storage system according to claim 17, wherein said information related to said one destination disk drive is an ID number of said destination disk drive.

20. A storage system comprising:
a plurality of disk drives;
first and second disk array controllers, each of said first and second disk array controllers being adapted to control Redundant Array of Independent Disks (RAID) processes on each of said disk drives;
a first switch, external of said first and second disk array controllers, being coupled to said first disk array controller and to said disk drives;
a second switch, external of said first and second disk array controllers, being coupled to said second disk array controller and to said disk drives;
wherein:
said first switch performs path switching among paths, each of which is coupled to one disk drive of said disk drives, when said first switch receives information related to one destination disk drive, and said first disk array controller performs a first data transfer to said one destination disk drive of said disk drives via said first switch,
said second switch performs path switching among paths, each of which is coupled to one disk drive of said disk drives, when said second switch receives information related to another destination disk drive, and said second disk array controller performs a second data transfer to said another destination disk drive of said disk drives via said second switch, wherein said first data transfer is performed separately from said second data transfer.

21. The storage system according to claim 20, wherein said information related to said one destination disk drive is sent from said first disk array controller to said first switch and identifies said one destination disk drive.

22. The storage system according to claim 20, wherein said information related to said one destination disk drive is an ID number of said one destination disk drive.

23. A storage system comprising:
a plurality of disk drives;
a plurality of disk array controllers, each disk array controller controlling Redundant Array of Independent Disks (RAID) processes on said disk drives; and
a plurality of switches external of said disk array controllers, wherein
a first disk drive of said disk drives is coupled to a first disk array controller of said disk array controllers via a first switch of said switches and is coupled to a second disk array controller of said disk array controllers via a second switch of said switches,
a second disk drive of said disk drives is coupled to said first disk array controller via said first switch and is coupled to said second disk array controller via said second switch,
each of said switches, when receiving information related to one destination disk drives, performs path switching among paths, each of which is coupled to one disk drive of said disk drives, based on said received information, and one of disk array controllers performs a data transfer to said one destination disk drive of said disk drives via each of said switches.

* * * * *